United States Patent
Iwai et al.

(10) Patent No.: US 7,348,086 B2
(45) Date of Patent: Mar. 25, 2008

(54) FUEL CELL

(75) Inventors: Ken Iwai, Yokosuka (JP); Atsushi Miyazawa, Yokosuka (JP); Jianbo Zhang, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 565 days.

(21) Appl. No.: 10/468,221

(22) PCT Filed: Nov. 12, 2002

(86) PCT No.: PCT/JP02/11788

§ 371 (c)(1),
(2), (4) Date: Aug. 18, 2003

(87) PCT Pub. No.: WO03/050905

PCT Pub. Date: Jun. 19, 2003

(65) Prior Publication Data

US 2004/0081873 A1    Apr. 29, 2004

(30) Foreign Application Priority Data

Dec. 11, 2001   (JP) .............................. 2001-376851

(51) Int. Cl.
*H01M 8/02*  (2006.01)
*H01M 8/04*  (2006.01)

(52) U.S. Cl. .......................................... 429/26; 429/39
(58) Field of Classification Search ...................... None
See application file for complete search history.

(56) References Cited

U.S. PATENT DOCUMENTS 6,261,710 B1 *  7/2001  Marianowski ............... 429/34
6,849,351 B2    2/2005  Hartnack et al.
7,029,784 B2 *  4/2006  Carlstrom ..................... 429/38

FOREIGN PATENT DOCUMENTS

| EP | 1 009 051 A2 | 6/2000 |
|---|---|---|
| EP | 1 286 404 A2 | 2/2003 |
| JP | 58-155664 A | 9/1983 |
| JP | 6-20708 A | 1/1994 |
| JP | 6-260193 A | 9/1994 |
| JP | 10-308227 A | 11/1998 |
| JP | 2001-291522 A | 10/2001 |
| JP | 2002-260710 A | 9/2002 |
| JP | 2003-59513 A | 2/2003 |
| JP | 2003-123794 A | 4/2003 |
| JP | 2003-142120 A | 5/2003 |
| JP | 2004-516626 A | 6/2004 |
| WO | WO 00/02267 A2 | 1/2000 |
| WO | WO 01/37362 A2 | 5/2001 |
| WO | WO 02/23645 A2 | 3/2002 |

* cited by examiner

*Primary Examiner*—Jonathan Crepeau
(74) *Attorney, Agent, or Firm*—Foley & Lardner LLP

(57) ABSTRACT

A fuel cell (1) is constituted by stacking membrane electrode assemblies (2) and separators (3), wherein fuel gas passages (16), oxidizing gas passages (17) and coolant passages (9), which are formed by the separators (3), are arranged in parallel along the outer surfaces of gas diffusion layers (6A) and (6C) of the membrane electrode assemblies (2). With such a constitution, a thickness dimension of the separators (3) can be reduced, and with respect to a stacking direction of the fuel cell stack, the number of stacked unit cells can be increased in the same dimensions as that of the conventional fuel cell stack. Therefore, a fuel cell stack with a high output density can be obtained.

3 Claims, 4 Drawing Sheets

FUEL CELL

TECHNICAL FIELD

The present invention relates to a solid polymer electrolyte fuel cell (SPEFC) that uses a solid polymer electrolyte for an electrolyte layer and is supplied with a reactive gas to obtain electric energy by an electrochemical reaction.

BACKGROUND ART

As a basic structure of a conventional solid polymer electrolyte fuel cell, there is one disclosed in Japanese Patent Application Laid-Open No. H6-260193 (1994). In the conventional membrane electrode assembly (MEA), catalyst layers, which contain precious metals (mainly platinum), are formed on both main surfaces of a solid polymer electrolyte. Porous material layers, which introduce a reactive gas to the solid polymer electrolyte, are further arranged on the outsides of the catalyst layers. Further, on the outsides of the porous material layers, separators are arranged. In the separators, anode-side separators and cathode-side separators are present. On one surface of the anode-side separator, fuel gas passages are formed, and on the other surface thereof, coolant passages are formed. In the cathode-side separators, oxidizing gas passages are formed. Unit cells, each being formed by constituent elements as described above, are sequentially stacked, and thus a fuel cell stack is constituted.

DISCLOSURE OF THE INVENTION

However, when the stack is formed in the constitution of such a conventional fuel cell as described above, the fuel gas passages, the oxidizing gas passages and the coolant passages, which are constituted in separate separators, are arranged in the thickness direction of the stack. Therefore, even if the structures of each anode-side separator and each cathode-side separator are thinned to some extent, the volume of the stack cannot be sufficiently reduced. Thus, there has been a problem that an output per unit volume, that is, an output density is limited.

The present invention has been made in consideration of the above problem. The object thereof is to provide a solid polymer electrolyte fuel cell with a high output density.

According to one aspect of the present invention, there is provided a fuel cell, comprising: a solid polymer electrolyte; catalyst layers disposed on both surfaces of the solid polymer electrolyte; gas diffusion layers having conductivity, the gas diffusion layers being disposed on the outer surfaces of the respective catalyst layers; and separators including a fuel gas passage, an oxidizing gas passage and a coolant passage, the separators being disposed on the outer surfaces of the respective gas diffusion layers, wherein the coolant passage is disposed in parallel to any one of the fuel gas passage and the oxidizing gas passage in a direction along the surface of the gas diffusion layer.

BEST MODE FOR CARRYING OUT THE INVENTION

To describe the present invention in more detail, preferred embodiments of the present invention will be explained with reference to the drawings below.

Embodiment 1

Figure 1:
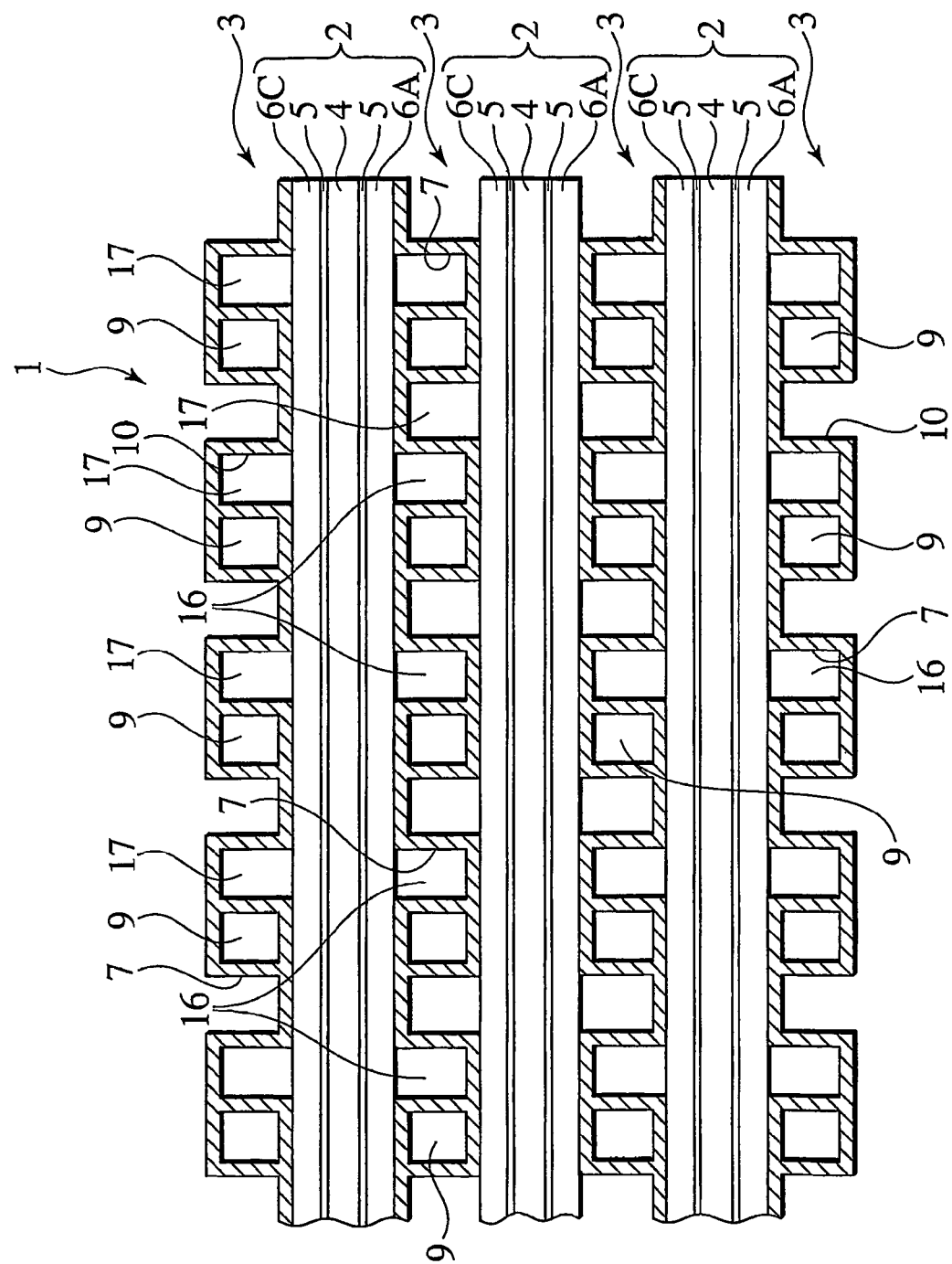
FIG. 1 is a substantial cross-sectional view showing a fuel cell of embodiment 1 of the present invention.

FIG. 1 shows a first embodiment of a fuel cell according to the present invention, showing a simple structure in which three unit cells are stacked for the convenience of explanation.

This embodiment is characterized in that a fuel gas passage, an oxidizing gas passage and a coolant passage, which are formed by separators, are arranged in line in the direction along an outer surface of a membrane electrode assembly.

As shown in FIG. 1, a fuel cell 1 according to this embodiment is constituted, for example, by stacking membrane electrode assemblies 2 and separators 3 to form an arbitrary number of layers. FIG. 1 shows three membrane electrode assemblies 2 and separators 3 arranged on both surfaces of the respective membrane electrode assemblies 2. Note that, a separator 3 is interposed between each of the membrane electrode assemblies 2.

The membrane electrode assembly 2 is constituted by a solid polymer electrolyte 4, catalyst layers 5, and gas diffusion layers 6A and 6C. The solid polymer electrolyte 4 electrochemically reacts a fuel gas and an oxidizing gas, which are supplied thereto. The catalyst layers 5 are arranged on both main surfaces of the solid polymer electrolyte 4, and accelerate the electrochemical reaction. The gas diffusion layers 6A and 6C are arranged on the outer surfaces of the respective catalyst layers 5, and are composed of porous materials having conductivity. One gas diffusion layer 6A functions as an anode, and the other gas diffusion layer 6C functions as a cathode.

Figure 2:
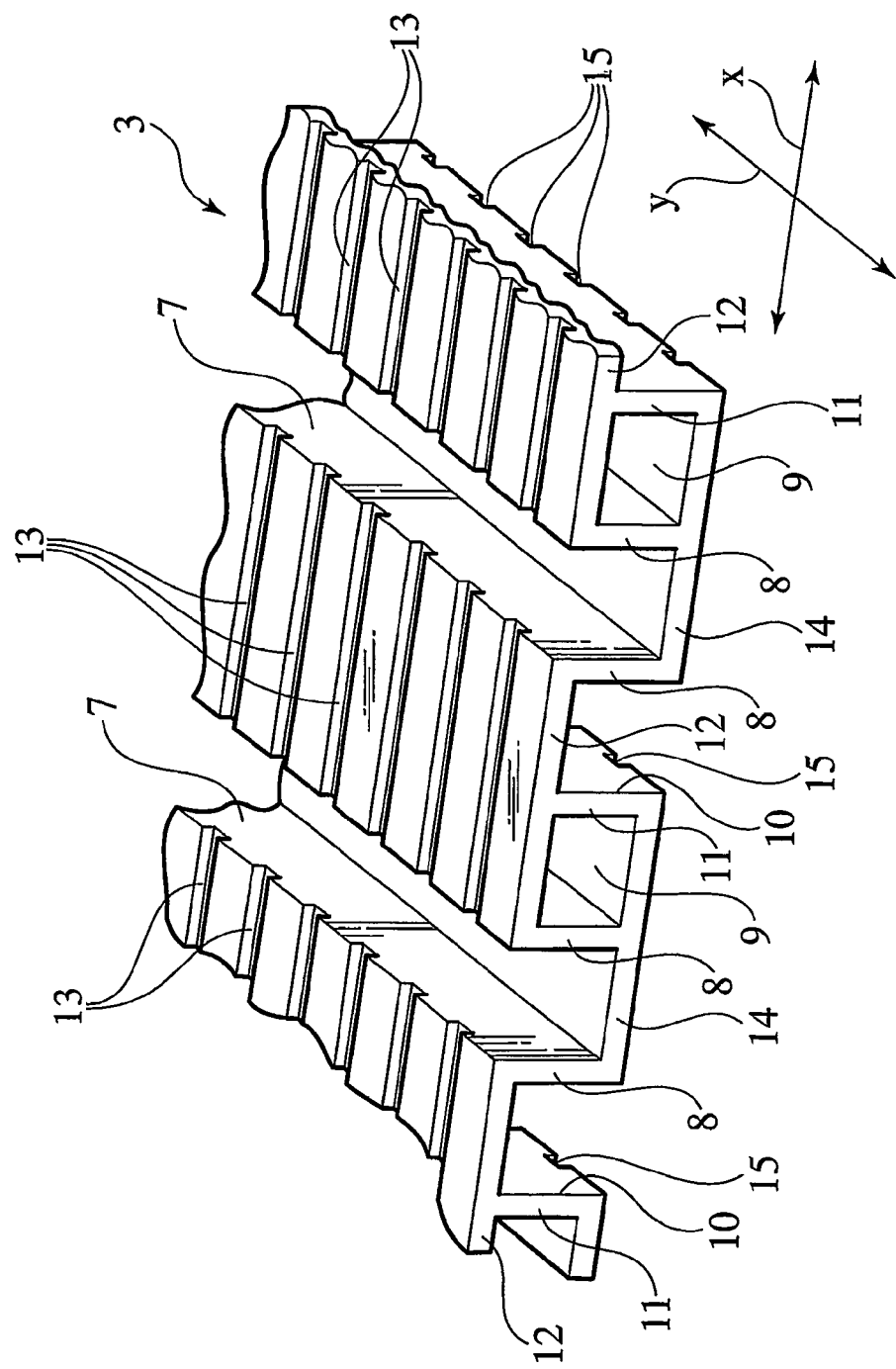
FIG. 2 is a perspective view showing a separator used for the fuel cell of embodiment 1 of the present invention.

As shown in FIG. 1 and FIG. 2, the separator 3 has a plate-shaped structure having an area approximately equal to that of the membrane electrode assembly 2. More specifically, as shown in FIG. 2, on one surface of the separator 3, a plurality of fuel-gas-passage forming grooves 7 are formed in line at a predetermined interval along the y-direction shown in FIG. 2. On one side of each fuel-gas-passage forming groove 7 of the separator 3, a coolant passage 9 is formed so as to be parted therefrom by a compartment wall 8 forming the fuel-gas-passage forming groove 7. In the separator 3, the coolant passage 9 is formed so as to penetrate therethrough along the y-direction shown in FIG. 2.

On the other surface of the separator 3, oxidizing-gas-passage forming grooves 10 are formed, each being located between each of the adjacent fuel-gas-passage forming grooves 7. These oxidizing-gas-passage-forming grooves 10 are also formed along the y-direction shown in FIG. 2. Consequently, as shown in FIG. 1 and FIG. 2, the fuel-gas-passage forming grooves 7, the coolant passages 9 and the oxidizing-gas-passage forming grooves 10 all extend in a line along the y-direction. Each oxidizing-gas-passage forming groove 10 and each coolant passage 9 is formed with a compartment wall 11 interposed therebetween.

On an outside of each wall 12 located between the fuel-gas-passage forming grooves 7 formed on one surface of the separator 3, a plurality of fuel-gas diffusion grooves 13 connecting the adjacent fuel-gas-passage forming grooves 7 are formed along the x-direction shown in FIG. 2. These fuel-gas diffusion grooves 13 are arranged along the y-direction at predetermined intervals.

Meanwhile, on an outer surface of each wall 14 located between the oxidizing-gas-passage forming grooves 10 formed on the other surface of the separator 3, a plurality of oxidizing-gas diffusion grooves 15 connecting these oxidizing-gas-passage forming grooves 10 are formed. Similarly to the fuel-gas diffusion grooves 13, these oxidizing-gas diffusion grooves 15 are also formed in parallel at a predetermined interval along the y-direction in FIG. 2.

The separators 3 and the membrane electrode assemblies 2, which are constructed as described above, are stacked as shown in FIG. 1, and thus the fuel cell 1 is constituted. Note that, in this embodiment, each separator 3 keeps the same structure even if it is inverted vertically. The stacked surface of the separator 3 becomes an anode or a cathode depending on a stacked state with the membrane electrode assembly 2. Therefore, when the stacked surface is an anode, the grooves thereof become the fuel-gas-passage forming grooves 7, and when the stacked surface is a cathode, the grooves thereof become the oxidizing-gas-passage forming grooves 10. Therefore, in this embodiment, it is possible for the separator 3 to function as both an anode-side separator and a cathode-side separator depending on whether the separator 3 is arranged on the anode-side or cathode-side of the membrane electrode assembly 2.

In the fuel cell 1 according to the first embodiment thus constructed, as shown in FIG. 1, one surface of the separator 3 is joined to the anode-side gas diffusion layer 6A of the membrane electrode assembly 2. Thus, each fuel gas passage 16 is formed by the fuel-gas-passage forming groove 7 and the anode-side gas diffusion layer 6A. Moreover, the other surface of the separator 3 is joined to the gas diffusion layer 6C on the cathode side of the membrane electrode assembly 2, so that each oxidizing gas passage 17 is formed by the oxidizing-gas-passage forming groove 10 and the gas diffusion layer 6C on the cathode side.

In the first embodiment thus constructed, the coolant passages 9, the fuel gas passages 16 and the oxidizing gas passages 17 are arranged in parallel on one separator 3. Therefore, with respect to the stacking direction of the stack, the number of stacked unit cells can be increased in dimensions in the stacking direction, which is equivalent to the conventional one. Therefore, in the fuel cell 1 according to this embodiment, a fuel cell stack with a high output density can be obtained.

Moreover, in this embodiment, the fuel gas in the fuel gas passage 16 passes through the fuel-gas diffusion grooves 13, and thus the diffusion of the fuel gas in the gas diffusion layer 6A on the anode side is facilitated. Therefore, the fuel gas can be introduced to the membrane electrode assembly 2 efficiently. Similarly, the oxidizing gas in the oxidizing gas passages 17 passes through the oxidizing-gas diffusion grooves 15, and thus the diffusion of the oxidizing gas in the gas diffusion layer 6C on the cathode side is facilitated. Therefore, the oxidizing gas can be efficiently introduced to the membrane electrode assembly 2. Consequently, the electrochemical reaction between the fuel gas and the oxidizing gas in the membrane electrode assembly 2 can be carried out efficiently.

In this embodiment, the fuel-gas diffusion grooves 13 are formed on the walls 12 on one surface of the separator 3, and the oxidizing-gas diffusion grooves 15 are formed on the walls 14 on the other surface thereof. However, a constitution may be adopted, in which only any one of the fuel-gas diffusion grooves 13 and the oxidizing-gas diffusion grooves 15 is formed. Moreover, another constitution may be adopted, in which neither the fuel-gas diffusion grooves 13 nor the oxidizing-gas diffusion grooves 15 are formed (modification example).

Figure 3:
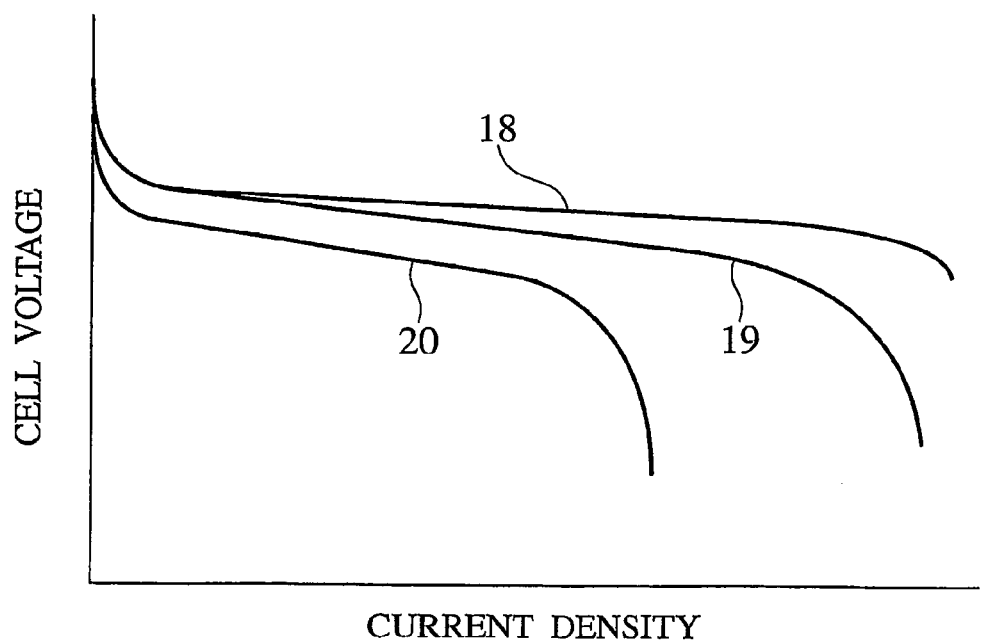
FIG. 3 is a graph showing the current-voltage curve of the fuel cell of embodiment 1 of the present invention, its modification example, and a conventional fuel cell.

FIG. 3 shows relationships between the current densities and cell voltages (current-voltage curves) per the same membrane area in the unit cell with respect to the conventional fuel cell described above, the fuel cell according to this embodiment, and the fuel cell constituted to form neither the fuel-gas diffusion grooves 13 nor the oxidizing-gas diffusion grooves 15. Reference numeral 18 denotes a curve of the conventional cell, reference numeral 19 denotes a curve of the fuel cell of the present invention with gas diffusion grooves, and reference numeral 20 denotes a curve of the fuel cell of the present invention without any gas diffusion grooves (modification example). As can be understood from FIG. 3, in the fuel cell of this embodiment and the fuel cell of the modification example, each performance per unit cell bears comparison with that of the conventional fuel cell in a region of low current densities, where the efficiency of the fuel cell is high. Particularly, as shown in FIG. 2, in the fuel cell of this embodiment, the fuel-gas diffusion grooves 13 and the oxidizing-gas diffusion grooves 15 are provided. Thus, the fuel gas and the oxidizing gas are supplied onto the contact surfaces of the separator 3, which are brought into contact with the gas diffusion layers 6A and 6C of the membrane electrode assembly 2. Therefore, an output per unit cell, which is equivalent in level to that of the conventional fuel cell, is obtained.

In this embodiment, since the dimension of the fuel cell stack can be reduced very much in the stacking direction, an output thereof per unit volume or unit weight, that is, the output density can be increased to a much larger extent as compared with the conventional one.

Embodiment 2

Figure 4:
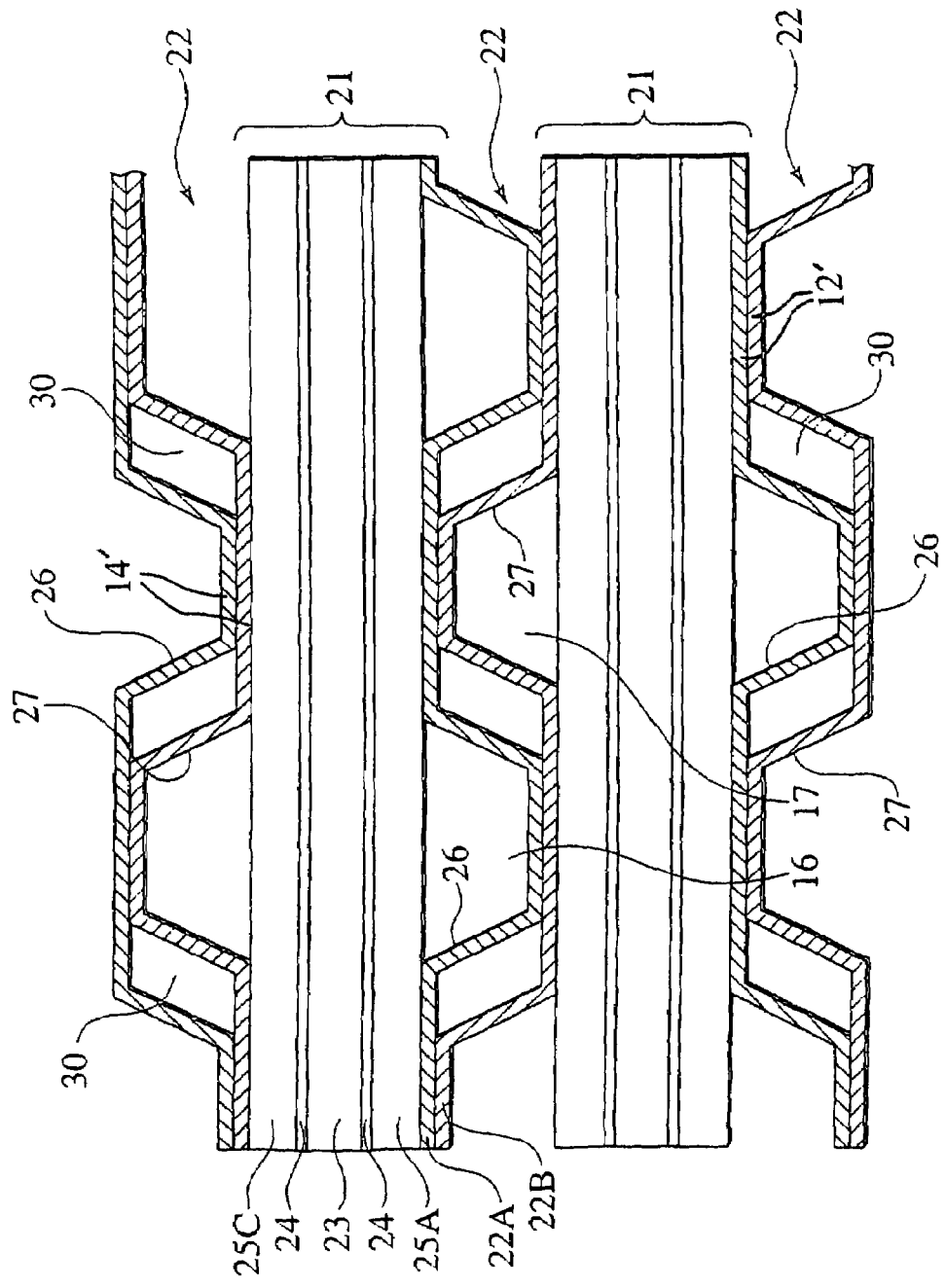
FIG. 4 is a substantial cross-sectional view showing a fuel cell of embodiment 2 of the present invention.

As shown in FIG. 4, the fuel cell according to this embodiment is constituted in such a manner that each unit cell is constituted by arranging separators 22 on both surfaces of a membrane electrode assembly 21, and that on this unit cell, the membrane electrode assemblies 21 and the separators 22 are sequentially stacked.

Similarly to the foregoing first embodiment, each membrane electrode assembly 21 in this embodiment is constituted by a solid polymer electrolyte 23, catalyst layers 24 and gas diffusion layers 25A and 25C. The solid polymer electrolyte 23 electrochemically reacts the fuel gas and the oxidizing gas, which are supplied thereto. The catalyst layers 24 are arranged on both main surfaces of this solid polymer electrolyte 23, and accelerate the electrochemical reaction. The gas diffusion layers 25A and 25C are arranged on the outer surfaces of the respective catalyst layers 24, and further, are composed of porous materials having conductivity. Here, one gas diffusion layer 25A functions as an anode, and the other gas diffusion layer 25C functions as a cathode.

As shown in FIG. 4, in each separator 22, fuel-gas-passage forming grooves 26 are formed on one side surface, and oxidizing-gas-passage forming grooves 27 are formed on the other side surface. In the case of this embodiment, the fuel-gas-passage forming grooves 26 and the oxidizing-gas-passage forming grooves 27 are formed to gradually widen from bottom surfaces to the groove-forming surfaces. However, they do not have to be formed so as to gradually widen.

Then, both of the fuel-gas-passage forming grooves 26 and the oxidizing-gas-passage forming grooves 27 are formed so as to be parallel along the direction of the contact surface to the membrane electrode assembly 21.

Between the fuel-gas-passage forming groove 26 and the oxidizing-gas-passage forming groove 27 adjacent to each other, a coolant passage 30 is formed.

Furthermore, as shown in FIG. 4, in the constitution of the separator 22, the coolant passages 30 are constituted by stacking a separator 22A constituting the fuel gas passages 16 and a separator 22B constituting the oxidizing gas passages 17. Therefore, there is an effect in that the shape of each separator is simplified to facilitate the fabrication thereof.

With such a constitution, the coolant passages 30, the stacked fuel-gas-passage forming grooves 26 and the stacked oxidizing-gas-passage forming grooves 27 are arranged so as to be parallel in the direction of the contact surface to the membrane electrode assembly 21. Therefore, the thickness of the separator 22 can be reduced to a much larger extent as compared with that of the conventional separator.

Therefore, with respect to the stacking direction of the stack, the number of stacked unit cells can be increased in a dimension in the stacking direction, which is equivalent to the conventional one. Therefore, also in the fuel cell according to this embodiment, a fuel cell stack with a high output density can be obtained.

Note that, on both surfaces of the separator 22 for use in this embodiment, gas diffusion grooves similar to those of the first embodiment may be formed.

FIG. 4 also depicts wall 12' and wall 14'.

The entire content of a Japanese Patent Application No. P2001-376851 with a filing date of Dec. 11, 2001 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

As described above, in this application, with respect to the stacking direction of the fuel cell stack, the number of stacked unit cells can be increased in same dimensions in comparison with the conventional fuel cell stack. Therefore, a fuel cell stack with a high output density can be obtained. Moreover, since the thickness dimension of the separator can be further reduced, a fuel cell stack with a higher output density can be realized. Furthermore, since the gas flowing through the fuel gas passages and the oxidizing gas passages can be introduced to the gas diffusion layer via the gas diffusion grooves, the electrochemical reaction between the fuel gas and the oxidizing gas in the solid polymer electrolyte can be carried out efficiently. Then, since a constitution is adopted in which two types of separators can be stacked, the shape of each separator can be simplified.

The invention claimed is:

1. A fuel cell, comprising:
a solid polymer electrolyte;
catalyst layers disposed on both surfaces of the solid polymer electrolyte;
gas diffusion layers having conductivity, the gas diffusion layers being disposed on the outer surfaces of the respective catalyst layers to function as an anode and a cathode, respectively; and
separators including a fuel gas passage, an oxidizing gas passage and a coolant passage with walls therefor provided with a cathode-side wall and an anode-side wall, the separators being disposed on the outer surfaces of the respective gas diffusion layers,
wherein the coolant passage, the fuel gas passage and the oxidizing gas passage overlap with the same plane, said plane being defined as a plane parallel to the plane of the gas diffusion layer,
and wherein the cathode-side wall is in contact with the fuel gas passage and the cathode while being arranged therebetween, and the anode-side wall is in contact with the oxidizing gas passage and the anode while being arranged therebetween.

2. The fuel cell of claim 1, further comprising:
gas diffusion grooves provided on respective contact surfaces of the walls of the separators brought into contact with the gas diffusion layers.

3. The fuel cell of claim 1, wherein each of the separators is constituted by stacking a separator constituting the fuel gas passage and a separator constituting the oxidizing gas passage.

* * * * *